United States Patent Office 3,791,959
Patented Feb. 12, 1974

3,791,959
BLENDED REFRIGERATION OIL COMPOSITION
Ivor W. Mills, Media, and John J. Melchiore, Wallingford, Pa., assignors to Sun Oil Company of Pennsylvania, Philadelphia, Pa.
No Drawing. Continuation-in-part of application Ser. No. 63,303, Aug. 12, 1970, now Patent No. 3,715,302. This application Nov. 18, 1971, Ser. No. 200,185
Int. Cl. C10g *41/00*
U.S. Cl. 208—19                  12 Claims

ABSTRACT OF THE DISCLOSURE

A wide boiling range (e.g. for a given VGC) refrigeration oil, having good chemical and thermal stability and good miscibility with fluorinated hydrocarbon refrigerants, comprises a blend of from 50–75 volume percent of a hydrorefined naphthenic oil component and 50–25 volume percent of a wax free paraffinic component (such as a solvent refined and dewaxed paraffinic oil). Preferably, the hydrorefined naphthenic oil component (which can be a blend of two or more hydrorefined oils) has an SUS viscosity at 100° F. in the range of 75–750 SUS and the paraffinic component (which can be a blend) is chosen so that the resulting naphthenic-paraffinic blend has a viscosity at 100° F. in the range of 100–500 SUS (preferably 125–300 SUS, typically 150–250 SUS) and has a maximum natural floc point of −35° F. Preferably the blend contains less than 10 p.p.m. (more preferably less than 5) of basic nitrogen and contains in the range of 15–35 weight percent aromatics. The preferred paraffinic components include dewaxed paraffinic petroleum lubes, wax-free hydrogenated polyolefin oils, hydrocracked lubes and mixtures thereof.

CROSS REFERENCE TO RELATED APPLICATIONS

This application is a continuation-in-part of our application Ser. No. 63,303 filed Aug. 12, 1970 entitled "Refrigeration Oil Composition Having Wide Boiling Range," now U.S. 3,715,302, issued Feb. 6, 1973.

The following patents and applications, all assigned to The Sun Oil Company (as is the present application), are related to the disclosure of the present application in that they disclose methods of obtaining hydrorefined naphthenic oils, wax-free paraffinic components and methods of reducing the basic nitrogen content of component oils which can be used to make the blended refrigeration oil composition of the present invention. Other methods for obtaining hydrorefined naphthenic and wax-free paraffinic fluids, useful as such blending components, are well known to the art.

The disclosure of said Ser. No. 63,303 and of all of the following applications and patents is hereby incorporated in the present application:

| Serial No. | Filing date | Patent No. | Issue date | Title/inventor(s) |
|---|---|---|---|---|
| 530,580 | 2-28-66 | Abandoned | 11-15-69 | Stable Lubricating Oil—Sheldon L. Thompson. |
| 622,398 | 3-13-67 | 3,462,358 | 8-19-69 | Clay Treatment of Hydrorefined Cable Oils—Ivor W. Mills and Glenn R. Dimeler. |
| 636,493 | 5-5-67 | 3,681,279 | 8-1-72 | Process for Preparing an Aromatic Oil and Non-Discoloring Rubber Composition Containing Said Oil—Ivor W. Mills, Glenn R. Dimeler, and Merritt C. Kirk, Jr. |
| 652,026 | 7-10-67 | 3,502,567 | 3-24-70 | Process for Producing Cable Oils by Sequential Refining Steps—Ivor W. Mills and Glenn R. Dimeler. |
| 657,438 | 5-29-67 | | | Rubber Containing Acid-Treated Oils and Its Preparation—Abraham Schneider and Archibald P. Stuart. |
| 730,999 | 5-22-68 | | | Hydrorefined Transformer Oil and Process of Manufacture—Ivor W. Mills and Glenn R. Dimeler. |
| 812,516 | 2-19-69 | 3,619,414 | 11-9-71 | Catalytic Hydrofinishing of Petroleum Distillates in the Lubricating Oil Boiling Range—Ivor W. Mills, Merrit C. Kirk, Jr., and Albert T. Olenzak. |
| 828,746 | 5-29-69 | 3,658,689 | 4-25-72 | Isomerization of Waxy Lube Streams and Waxes—Ib Steinmetz and David S. Barmby. |
| 850,716 | 8-18-69 | Abandoned | 9-29-71 | Blended Hydrocarbon Oil and Process of Manufacture—Ivor W. Mills and Glenn R. Dimeler. |
| 850,717 | 8-18-69 | Abandoned | 3-3-72 | Hydrorefined Lube Oil and Process of Manufacture—Ivor W. Mills and Glenn R. Dimeler. |
| 850,778 | 8-18-69 | 3,654,127 | 4-4-72 | Process for Preparing High Viscosity Hydrorefined Cable Oil—Ivor W. Mills, Glenn R. Dimeler, William A. Atkinson, and David A. Hoffman. |
| 873,008 | 10-27-69 | | | Oil and Process of Manufacture of Blended Hydrorefined Oil—Ivor W. Mills and Glenn R. Dimeler. |
| 874,087 | 10-27-69 | 3,706,653 | 2-19-72 | Light-Colored Highly Aromatic Oil and Process of Preparation—Ivor W. Mills, Glenn R. Dimeler, and Merritt C. Kirk, Jr. |
| 875,502 | 11-10-69 | Abandoned | 9-26-72 | Stable Lubricating Oil—Sheldon L. Thompson. |
| 16,495 | 3-4-70 | 3,673,078 | 6-27-72 | Process for Producing High UR Oil by Hydrogenation of Dewaxed Raffinate—Merritt C. Kirk, Jr. |
| 22,295 | 3-24-70 | 3,681,233 | 8-1-72 | Hydrorefined Cable Oil and Process of Manufacture—Ivor W. Mills and Glenn R. Dimeler. |
| 28,608 | 4-15-70 | | | Process for Producing Liquid Polymers of Mono-Olefine Using Alumino-Silicate Catalyst—Alfred E. Hirschler. |
| 28,942 | 4-15-70 | | | Process for Producing Polyisobutylene Oils—Alfred E. Hirschler and Gary L. Driscoll. |
| 35,231 | 5-6-70 | | | Hydraulic Oil Composition Containing a Blended Base Stock—John Q. Griffith III, Edward S. Williams William H. Reiland, Jr., Ivor W. Mills, and Glenn R. Dimeler. |
| 42,520 | 6-1-70 | | | Preparation of High V.I. Lubes by Reforming—Sheldon L. Thompson. |
| 52,300 | 7-6-70 | | | Branched Hydrocarbons in the C₁₆-C₄₀ Range Having Maximally Crowded Geninal Methyl Groups—Gary L. Driscole, Irl N. Duling, David S. Gates, and Robert W. Warren. |
| 52,301 | 7-6-70 | | | Polyisobutylene Oil Having a High Viscosity Index—Gary L. Driscoll, Irl N. Duling, and David S. Gates. |
| 52,772 | 7-6-70 | | | Preparation of Oils from Isobutene—Gary L. Driscoll. |
| 52,773 | 7-6-70 | | | Oligomerization of isobutene and-Methylstyrene—Gary L. Driscoll and David L. Kerr. |
| 64,656 | 8-17-70 | | | Hydrocracking Production of Lubes—Rene F. Kress. |
| 70,590 | 9-8-70 | | | Catalytic Hydrofinishing of Lube Oil Product of Solvent Extraction of Petroleum Distillate—Ivor W. Mills, Merritt C. Kirk, Jr., and Albert T. Olenzak. |
| 78,190 | 10-5-70 | | | Process of preparing Synthetic Lubricants from Low Molecular Weight Olefins—Richard S. Stearns, Irl N. Duling, and David S. Gates. |
| 78,191 | 10-5-70 | | | Synthetic Lubricants from Low Molecular Weight Olefins—Richard S. Stearns, Irl N. Duling, and David S. Gates. |
| 78,629 | 10-6-70 | | | Improvement in the Preparation of Lube Hydrocracking Stocks—Jeffrey R. Thomas and Ib Steinmetz. |
| 90,073 | 11-16-70 | | | Oil Stabilizing Sequential Hydrocracking and Hydrogenation Treatment—Sheldon L. Thompson, Rene F. Kress, Albert T. Olenzak, and Ib Steinmetz. |
| 134,095 | 4-14-71 | | | Polymerization of Dialkyl Vinylidene Compounds to Oil—Gary L. Driscoll. |
| 152,303 | 6-11-71 | | | Lubricant Comprising Gem-Structured Organ Compound—Gary L. Driscoll, and Marcus W. Haseltine, Jr. |
| 165,006 | 7-22-71 | | | Process for Producing Blended Petroleum Oil—Ivor W. Mills and Glenn R. Dimeler. |
| 165,141 | 7-22-71 | | | Blend Comprising Hydrorefined Oil and Raw Distillate—Ivor W. Mills and Glenn R. Dimeler. |
| 175,775 | 8-27-71 | | | Blended Hydrocarbon Oil and Process of Manufacture—Ivor W. Mills and Glenn R. Dimeler. |
| 178,193 | 9-7-71 | | | Composition Comprising Stabilized Hydrocracked Lube and an Antioxidant—Robert B. Bryer, William W. Crouse, Jr., John Q. Griffity III, Thomas D. Newingham, and William H. Reiland, Jr. |

BACKGROUND AND SUMMARY OF THE INVENTION

High temperature compressors operating with prior art naphthenic refrigeration oils develops coke deposits in the throttle valves. Apparently, these coke deposits are initiated by small partices of Mylar or other synthetic materials which are suspended or solubilized in the oil but deposit on the throttle valves because the oil vaporizes on hot spots. The deposits initiate decomposition of the refrigeration oil and cause it to coke.

A possible solution to this coking problem is to make a refrigeration oil with a high boiling point. One means of obtaining a higher boiling point is to use a paraffinic rather than a naphthenic oil. Refrigeration oils have been marketed which apparently consist of a paraffinic oil which has been acid treated. These oils usually contain some aromatics and although high boiling, have a narrow boiling range. In general, such paraffinic refrigeration oils lack the chemical stability of naphthenic refrigeration oils and/or they have a high floc point and poor miscibility with refrigerants (e.g. R-12).

The present invention relates to a refrigeration oil which has good chemical stability and also good thermal stability and which has a wider boiling range for a given VGC than does a prior art "paraffinic" refrigeration oil. The novel oil also retains a floc point no greater than —35° F. (more preferred less than —40° F.), has good miscibility with conventional refrigerants, has good sealed tube stability and permits the operation of compressors at higher operating temperatures (e.g. a coil temperature above 125° C.) than do present refrigeration oils.

A wide boiling range (e.g. for a given VGC) refrigeration oil of the present invention, having good chemical and thermal stability and good miscibility with fluorinated hydrocarbon refrigerants, comprises a blend of from 50–75 volume percent of hydrorefined naphthenic oil component and 50–25 volume percent of a wax-free paraffinic component. Preferably, the hydrorefined naphthenic oil component (which can be a blend of two or more hydrorefined oils) has an SUS viscosity at 100° F. in the range of 75–750 SUS and contains in the range of 15–50 wt. percent aromatic hydrocarbons (e.g. 20–35 wt. percent). The paraffinic component is chosen so that the resulting naphthenic-paraffinic blend has a viscosity at 100° F. in the range of 100–500 SUS (preferably 125–300 SUS, typically 150–250 SUS) and has a maximum natural (i.e. does not contain a pour point depressant) floc point of —35° F. Preferably the blend contains less than 10 p.p.m. (more preferably less than 5) of basic nitrogen and contains at least 10 wt. percent (more preferred in the range of 15–35 weight percent) aromatics. The paraffinic component can contain or consist of hydrorefined paraffinic oil having a low wax content. The hydrorefined naphthenic component can be a raffinate from solvent extraction (either before or after hydrorefining) as with furfural, to reduce the aromatic content. The blends of the present invention have a greater aromatic content, and have a generally lower natural floc point (for a given viscosity at 100° F.) than do the transmission oil blends of U.S. Pat. 3,450,636 to Rausch, which issued June 17, 1969.

The paraffinic component can be a wax-free, hydrogenated polyolefin oil or a high viscosity index, hydrocracked lube or a mixture of such components.

The preferred polyolefin oils are polymers or copolymers of $C_2$–$C_8$ olefin which have a pour point no greater than —35° F., and preferably below —50° F. The hydrogenation can be from 50% to 100% of saturation and, preferably, is to a bromine number no greater than 10, more preferably less than 5. Preferred polyolefins include ethylene-propylene copolymer, polypropylene, polybutane (especially polysobutene), and poly (1-octene).

The polyolefin (e.g., polybutane in the $C_{16}$–$C_{40}$ range) can be partially or fully hydrogenated. Preferred polyolefins include those described in U.S. Pat. 3,576,898 to Blake et al. issued Apr. 27, 1971, and in the following U.S. patent applications (the disclosure of which is incorporated herein by reference):

| Serial No. | Filing date | Inventors |
|---|---|---|
| 28,942 | 4–15–70 | Hirschler-Driscoll. |
| 52,300 | 7– 6–70 | Driscoll-Duling-Gates-Warren. |
| 52,301 | 7– 6–70 | Driscoll-Duling-Gates. |
| 78,191 | 10– 5–70 | Stearns-Duling-Gates. |
| 132,295 | 4–19–71 | Driscoll-Haseltine. |
| 133,637 | 4–13–71 | Duling-Glazier. |
| 135,295 | 4–19–71 | Driscoll-Haseltine. |
| 144,165 | 5–17–71 | Haseltine-Driscoll. |
| 162,896 | 7–15–71 | Duling-Gates. |

The hydrocracked lube oils which can be employed as the paraffinic component are preferably solvent extracted after hydrocracking and the raffinate product is used as the blending component. Examples of such hydrocracked oils are found in the U.S. Pat. 3,579,435 and the following previously cited commonly-owned applications:

| Serial No. | Filing date | Inventors |
|---|---|---|
| 780,241 | 11–19–68 | Thompson et al. |
| 875,502 | 11–10–69 | Thompson. |
| 64,656 | 8–17–70 | Kress. |
| 90,073 | 11–16–70 | Thompson et al. |
| 178,193 | 9– 7–71 | Bryer et al. |

The following Table I presents typical properties of stabilized hydrocracked oils which can be used in practice of the present invention. Further properties of useful hydrocracked oils can be found, for example, in previously cited applications 530,580; 780,241; 64,656 and 78,629.

TABLE I.—PROPERTIES OF HYDROCRACKED OILS [1]

| Viscosity (SUS, 100° F.) | ASTM VI | Gravity, API | Wt. percent aromatics | Aniline point ° F. |
|---|---|---|---|---|
| 100 | 103 | 34.2 | 12 | 220 |
| 200 | 107 | 33.3 | 11 | 235 |
| 500 | 107 | 31.5 | 13 | 250 |

[1] All oils dewaxed to a 0° F. pour point by chilling in a solvent and stabilizing by extraction with furfural.

The high V.I. hydrocracked lube component is obtained by hydrocracking a high viscosity distillate or dewaxed distillate from a paraffinic crude (such as Lagomedio) and typically has a V.I. in the range of 90–105. The hydrocracked lubes can be stabilized by extraction with aromatic selective solvents, such as furfural or phenol. One process for preparing such a high V.I. lube oil comprises fractionating the stock material (such as an atmospheric residuum from Lagomedia crude) into three fractions, boiling at (a) from 720–855° F., (b) 855 to 980° F. and (c) the residuum or a fraction boiling at from 986–1070° F., solvent extracting fraction (b) with a solvent having preferential solubility for aromatics such as furfural, recombining the three fractions, and hydrocracking the combined fractions at from 720 to 800° F. using a hydrogen partial pressure of from 2,000 to 3,000 p.s.i., and a sulfided nickel-tungsten catalyst supported on silica-alumina and containing a minor amount of a fluoride (e.g. Gulf GC–6). The higher boiling fraction is deasphalted if required.

The novel oil can be made by blending a low basic nitrogen content paraffinic oil (having a viscosity at 100° F. of about 500 SUS) with a low basic nitrogen content hydrorefined naphthenic oil (e.g. having an SUS viscosity at 100° F. of about 150). A preferred process for insuring a low basic nitrogen content (e.g. having less than 5 p.p.m., typically 1 p.p.m. or less) in the naphthenic and paraffinic components and/or in the blend comprises acid or acid-clay contacting the blend and/or one or more of the component oils. For example, the Lewis acid contacting (preferably with neutralization) of the aforementioned applications Ser. Nos. 622,398 (now U.S. Pat. 3,462,358); 652,026 (now U.S. Pat. 3,502,-

567); 657,438; 850,717 and 850,779. A preferred method of reducing the basic nitrogen in a blend of a hydrorefined naphthenic oil and a dewaxed paraffinic oil or in one or both of these component oils is to contact the oil with an adsorbent comprising an acid-activated adsorbent clay, more preferably an admixture or combination of an acid-activated adsorbent clay and a fuller's earth bleaching clay such as attapulgite. Useful adsorbent admixtures and process conditions for such contacting are disclosed in U.S. Pat. No. 3,369,999, for the decolorizing of waxes.

FURTHER DESCRIPTION

By naphthenic distillate, we refer to a distillate fraction (or a mildly acid treated distillate fraction, or a solvent raffinate fraction or an acid-treated raffinate) usually from vacuum distillation, of a crude which is classified as naphthenic (including "relatively naphthenic") by the viscosity-gravity constant (VGC) classification method. Preferably, such crudes are "Grade A" (wax-free), typicaly Gulf Coastal, and include, for example, Refugio, Mirando, and Black Bayou. The lower VGC oils can be obtained from mid-continental crudes; however, dewaxing may be necessary (as by extraction or isomerization) to insure, for 50–70 SUS transformer oils, that the final blended oil has a pour point of less than —60° F. Such fractions will have a VGC in the range of 0.820 to 0.899 and, usually a viscosity in the range of 30–200 SUS at 100° F. (typically, 40–70). In some cases the crude (and distillate) can have a VGC as high as 0.94 (such crudes are characterized as "mildly aromatic"). Deep furfural extraction (e.g., about 50% yield) of a high VGC Grade A crude can be used to produce a wax-free, lower VGC fraction (e.g. 0.83 VGC) which can be used in low floc point (or pour point) blends.

One important test of refrigeration oil quality is the floc point, which is a measure of the tendency of wax separation from the oil under conditions which simulate actual operation in a refrigeration system. The second important test, which can be correlated with actual use conditions, is the 14-day sealed tube stability test.

The floc point is the temperature at which a floc of wax or other solid substances separates from a 10% mixture of the oil in R–12 refrigerant ($CCl_2F_2$). Lint-like floc is to be contrasted with cloud-like haze. The test apparatus comprise a 15 ml. graduated tube, 27.9 cm. x 14 mm. with 2 mm. thick walls, a pressure tube holder, a cooling bath, a thermometer, and a cooling coil. The cooling bath can be large, wide mouth Dewar flask (Fisher Scientific Co. #14–197, size 2, is satisfactory). Dry Ice and acetone are used as the cooling medium. The thermometer can be ASTM Low Cloud and Pour 6F, having a range —112 +70 F. The R–12 cooling coil is made of ¼" copper tubing, and is immersed in the Dry Ice-acetone bath to chill the refrigerant to below —25 F. so that it may be charged as liquid to the graduated tube containing the sample. In this test, a sample of the oil to be tested is charged to a graduated glass tube and chilled refrigerant is added. The tube is sealed in the tube holder and the system is allowed to warm enough to become homogeneous on shaking. The mixture is then cooled in a chilling bath until there is a distinct floc present in it. The temperature at that point is reported as the floc point, since considerable pressure is developed in the glass tube during the test, the tube should be wrapped with a cloth towel when it is removed from the cooling bath. The operator should wear a protective face mask.

The procedure involves pipetting 1 cc. of the oil to be tested to a glass tube. The glass tube and sample are inserted into the pressure tube holder and the assembly is immersed into the cooling bath and chilled to a temperature below the boiling point of the refrigerant (—25 F. for R–12). The refrigerant is condensed by passing it slowly through copper cooling coil and the liquid is added to the cooled sample tube until the liquid level reaches the 10 cc. mark on the tube. That is, total volume of the oil-refrigerant mixture is 10 cc. The charged tube is then tightly sealed and allowed to warm up to a temperature sufficiently high to permit making the system homogeneous by shaking. The assembly with the refrigerant-sample mixture is then cooled in the Dry Ice-acetone bath. The temperature of the bath is lowered at a rate of approximately one or two degrees Fahrenheit per minute by careful addition of Dry Ice. Observations are made at 1 degree intervals, beginning at 0 F. When such observations first reveal a distinct flocculent material suspended in the mixture, the reading of the test thermometer in the bath is recorded as the floc point. This floc point test is reproducible within at least 2° F. Some oils show a haze at a temperature slightly above the floc point temperature. This temperature is usually 5 to 10 above the actual floc point. If a test oil clouds at about 0 F., the test should be repeated to be certain that moisture has not been inadvertently introduced into the test apparatus.

The second important test, the 14-day sealed tube stability, rates the quality of a refrigeration oil by evaluation of the appearance of the oil and a metal test strip, and the mount of reaction of an oil with a halogenated refrigerant after ageing in a sealed tube.

Since oil and gases are under pressure in the glass tubes, the tubes should be treated as though they might explode at any time. Safety glasses, a plastic face shield and heavy leather gloves should be worn when handling a sealed tube.

The method consists of sealing 5 ml. of an oil, "R–12" refrigerant, and a steel strip in a heavy-walled glass tube which is then heated in an oven to 347±° F. and aged at the temperature for 14 days. The oil is rated on appearance at 14 days. After 14 days the tubes are opened and the contents analyzed by vapor phase chromatography for the percentage of R–22 and R–12, thus determining the decomposition of R–12 ($CCl_2F_2$) to R–22 ($CHClF_2$). The detailed procedure for the sealed tube stability test is well known in the refrigeration manufacturing and petroleum refining industries. For example, the procedure was reported and published in print by H. O. Spauschus and G. C. Doderer, at the 73rd ASHRAE Annual Meeting, Toronto, Ontario, June 28, 1966.

In the oil of the present invention, it is important that either the blended oil or all of its components be as free of basic nitrogen as is practical. Preferred means of reducing basic nitrogen being contacting with acid (e.g. $H_2SO_4$) and neutralization, or by contacting with an acid-activated clay (preferably a mixture of acid-activated clay and attapulgite). Such contacting to reduce the basic nitrogen in the oil insures good 14 day sealed tube stability (e.g., maximum of 2.5% R–22, more preferably 1.5% maximum, typically less than 1.0%).

The acid or acid clay treatment of the paraffinic component also causes improved results in the Falex failure load test, which is a test to determine lubricating quality of a refrigeration oil.

One low pour point, low basic nitrogen content oil, which can be used as a naphthenic component in the blends of the present invention is a high VGC oil produced by refining a blend of heavy catalytic gas oil (HCGO) and catalytic slurry oil (CSO). The blend is in about yield porportion (from cracking of a given feed stock, such as virgin gas oil). The heavy gas oil is the distillate product (from the cracked gas oil) which boils mainly above about 600° F. and can have an end point at about thermal cracking temperature at about 5 mm. Hg absolute pressure. The slurry oil can be the recycle from any catalytic cracking process, for example, see Ser. No. 730,999.

The blend of HCGO and CSO (or a distillate fraction of the blend, e.g., 500–850° F.) is refined by furfural extraction, followed by naphtha washing of the extract to obtain a product containing at least 99 wt. percent aromatics and having a pour point below 0° F. (in contrast to the 40–70° F. pour point of the original blend).

The 99+% aromatic product (which is useful as a heat exchange medium or as a seal swell agent) is then processed by one of two routes. Preferably, the product is mildly catalytically hydrocracked (e.g., no more than 20% conversion to products boiling below 600° F.) to obtain some ring opening and some ring hydrogenation. This product can be distilled to obtain a high boiling franction, useful in blends of the present invention.

Alternatively, instead of a hyrdocracking step (which can require a prior hydrodesulfurization step), the 99+% aromatic product of the naphtha wash (after furfural stripping) can be hydrorefined (as with sulfided NiMo catalyst) under hydrogenation conditions which decrease the ultraviolet absorptivity at 260 millimicrons by at least 10% to about 50% to produce a low basic nitrogen, high VGC oil, the high boiling distillate fractions of which can be used as a "naphthenic" blending component in the present invention. This hydrorefined product can be subjected to mild catalytic cracking to further adjust the VGC.

An alternative to the hydrorefining under hydrogenation conditions (which reduce the 260 UVA) is to conduct the hydrorefining at about the autofining point (which maintains aromaticity).

For example, a (642° F. initial to 827 end point, 95% point at 800° F.) distillate fraction of such a blend was extracted with 250 pol. percent furfural at about 80° F. and the extract, in solution with the furfural, was washed twice with 100% naphtha at about 80° F., then the furfural was flash evaporated to produce a 99.6 wt. percent aromatic oil having a refractive index of about 1.68. This oil was especially useful as a heat transfer medium or as a seal swell agent for automatic transmission fluids or in hydraulic oils. The oil could also be further refined by hydrocracking and/or hydrorefining, as described above, to produce a high VGC, low basic nitrogen, low pour point oil which could be used as a component of the blends of the present invention. This oil and its process of manufacture is the invention of Ivor W. Mills and is included in Ser. No. 280,919, filed Aug. 15, 1972.

ILLUSTRATIVE EXAMPLES

In the following examples, SUS viscosity is at 100° F. and parts are by volume, unless otherwise indicated.

Example 1

A hydrorefined naphthenic oil component having a viscosity of 150 SUS was obtained by blending 100 SUS and 500 SUS hydrorefined naphthenic oils. Each of these oils was obtained by severe hydrorefining (as defined in U.S. Pat. 3,462,358) of naphthenic acid-free naphthenic distillate. The hydrorefining was at 625° F., 1200 p.s.i.g. of 80% hydrogen, 0.25 LHSV, in the presence of sulfided NiMo oxide catalyst. The 150 SUS blended composition was contacted at about 240° F. with a mixture, per barrel of oil, of 10 pounds of acid-activated clay and 10 pounds of attapulgite. The resulting clay contacted 150 SUS hydrorefined naphthenic oil contained less than 1 p.p.m. of basic nitrogen.

A duosol solvent refined and methylethyl ketone dewaxed (to a pour point of 0° F.) paraffinic lube distillate, having a SUS viscosity of 500, was contacted at 240° F. with a mixture, per barrel of oil, of 10 pounds of acid-activated clay and 10 pounds of attapulgite. The resulting 500 SUS paraffinic component contained less than 1 p.p.m. of basic nitrogen.

A blended refrigeration oil, of the present invention, was obtained by blending 68 parts by volume of the 150 SUS hydrorefined naphthenic oil component and 32 parts of the 500 SUS paraffinic component. The properties of this blended refrigeration oil are reported in Table 1, along with a typical range of properties of a preferred blended refrigeration oil composition.

Table 2 hereof reports the distillation ranges in ° F., obtained under vacuum and corrected to at 1 atmosphere, of the hydrorefined naphthenic component, the refrigeration oil blend and the dewaxed paraffinic component. Note the wide boiling range of the blended refrigeration oil, compared with the boiling range of each component. In one preferred embodiment, at least 80 volume percent of the naphthenic component will distill below 800° F., corrected to 1 atmosphere, and at least 80 volume percent of the paraffinic component will distill above 800° F., corrected to one atmosphere, the latter requirement being the most important. More preferred, at least 50% of the paraffinic component should boil above 900° F.

Example 2

A blended refrigeration oil was obtained as in Example 1, except that the blend contained 63 parts of the 150 SUS hydrorefined naphthenic oil component and 37 parts of the 500 SUS dewaxed paraffinic component. This blended refrigeration oil had the same properties as those reported in Table 1 for the oil of Example 1 except that the viscosity at 100° F. was 235, the pour point was −25° F., the aniline point was 199.8° F. and the weight percent (gel) aromatics was 27.5.

The preformance of the blended refrigeration oil of this example was evaluated after 2,000 hours of operation with R–12 in a compressor at a coil temperature of about 160° C. The condition of the Mylar, the valves, the copper plating on the shafts and of the other operating parts after the 2,000 hours was significantly better than the condition of similar parts from a compressor run for 2,000 hours at 160° C. using a conventional naphthenic refrigerant (which failed before 2,000 hours).

In another series of "use tests," the blended refrigeration oil of this example was compared with a low basic nitrogen content dewaxed paraffinic refrigeration oil and with a refrigeration oil comprising 60% alkylated benzene and 40% mineral oil. The tests were run for 3 months at 160° C. winding temperature. The naphthenic-paraffinic blend of the present invention exhibited better wear and life properties than did the other two oils.

This was a severe test of themal stability since these compressors normally operate within the 130–140° C. temperature range. Generally, prior art naphthenic refrigeration oils are used in compressors where the temperature is in the 100–110° C. range.

Coking of compressor valves is not a new phenomenon in refrigeration systems. Knowledgeable refrigeration engineers believe that the long life of a refrigeration compressor is ultimately ended by carbonized deposits on the valve leaves. This causes improper seating of the valves, makes the compressor inefficient, and if allowed to continue, would eventually cause a compressor failure. In some cases, the deposit on the discharge valve leaf is quite soft and can be wiped off with a finger; however, such a deposit can cause severe reduction in efficiency.

Even modern compressors which use carefully selected materials can be destroyed by carbonization of valve leaves by operating them at high discharge temperatures. For example, deposits have been found on the valves (e.g., suction leaf and valve stop) from a refrigerator compressor operated for one week at a discharge cavity temperature of about 405° F.

While high discharge temperatures are not a design objective, they are an unavoidable result of design economies. Such changes have been the trend, whether they take the form of smaller size and heavier loading of compressor, thinner cabinet walls or smaller condenser sizes. These trends have reached a stage where further economies involve the danger of carbonized valves from the high discharge temperature. This temperature therefore, becomes critically important for new system design and for field reliability.

Two reasons have generally been offered in the art to explain carbonized valve deposits. Traditionally, deposits have been attributed to the breakdown of oil, particularly to the chemical reactions which occur between the oil and the refrigerant in the presence of metals. The maximum reaction occurs at the discharge valve which is the hottest spot in a compressor.

More recently, emphasis has been shifted to the thermal degradation of motor insulation. (ASHRAE, Guide & Data Book, Systems, 1970, Chapter 28, Refrigerant Systems Chemistry, pp. 415–416). According to this theory, the insulating materials used in the motor decompose at elevated temperatures and release the decomposition products into the oil. The oil which circulates through the system, carries these decomposition products to the discharge valve where they react or decompose further to form hard, tenacious deposits on the valve leaves.

Both of these theories fail to account for observed deposits. For example, in a compressor made in 1954, and which had to be discarded in 1970, the motor insulation theory offers a plausible explanation. The insulation system was polyvinyl formal, paper and cotton lead wire and tie cord, which had a nominal Class A rating. Under occasional heavy loading in the field, it is possible that some decomposition products were indeed released to the circulating oil. On the other hand, the used motor was in excellent condition and showed no clear evidence of high temperature operation. The magnet wire was still flexible and had good dielectric strength. The phase insulating paper could be folded repeatedly without cracking, except in the outermost layer. The cotton tie cord had a breaking strength of 12–15 lbs., which is over 10,000 p.s.i. based on the nominal cross-section. The excellent condition of the insulating materials, of course, does not preclude high temperature excursions of short duration. However, in case of the compressor which was operated for one week at 405° F. discharge temperature, the motor insulation theory does not remain valid. This compressor was specially built with polyimide film and polyimide wire insulation. The lead wires had tetrafluoroethylene insulation and only the tie cords were polyethylene terephthalate. The test was run under controlled conditions with winding temperatures at 250–260° F. It is most unlikely that the polyimides, which are considered to be extremely stable materials, would decompose at these temperatures within the seven days of operation. Therefore, the use of an insulation of high thermal rating did not prevent the carbonization of valves.

Similar to the hypothesis regarding motor insulation, the theory of chemical reactions between oil and Refrigerant 12 would be a plausible explanation for the 1954 model field unit. After all, at that time there were no quantitative laboratory methods for evaluating the chemical reactivity of oils, and it is quite possible that the oil used in that particular compressor may have been much more reactive than those available today. Such high reactivity could eventually cause carbonization.

Again, as in the case of motor insulation theory, this explanation is unsatisfactory when the nature of the deposits in the 405° F. discharge temperature case is considered. The compressor in this case had the least reactive naphthenic oil on the market, sold under the trade name "Suniso 3–G." Assuming that the conversion of R12 to R22 in a sealed tube test at 175° C. for 14 days in presence of valve steel is a reasonable measure of the chemical reactivity of an oil, the particular oil in that compressor shows a typical value of 0.1–0.2 percent conversion. This value is sometimes hereinafter referred to as a "Laboratory Reactivity Index." The use of an oil with a very low Laboratory Reactivity Index did not prevent the formation of carbonized deposits at the discharge valve. The possibility of contaminants also had to be ruled out, since all precautions were taken in the selection of the components, in the cleanliness of the system, and in the dehydration and evacuation of the unit.

A particularly interesting aspect of carbonization of valves with the low reactivity oil was that, except in the vicinity of the discharge valve, there were no other visual signs of oil breakdown. The oil in the sump remained clear with negligible color change. The bearings did not wear, copper plating was negligible, and the general appearance of the compressor parts was excellent. Even in the field unit of 1954, the compressor showed only a faint blush of copper plating at spots, the cellulosic motor insulation showed no signs of charring at any place, the bearings were totally unaffected, and again, except for the immediate vicinity of the discharge valve seat, the remainder of the valve and valve plate were clean and shiny. The oil in the compressor had an ASTM color 2 and appeared clear and clean.

Much has been written during the past decade regarding the chemical reactions of oils and refrigerants in the presence of metals and contaminants. Laboratory tests, which give consistent results between different laboratories, have been developed. Attempts have been made to interpret these laboratory data in terms of the reactions at the discharge valve of a compressor, with the hope that such interpretation would be useful in predicting the life of an operating compressor. See, for example, H. O. Spauschus and G. C. Doderer: Chemical Reactions of R22, ASHRAE Transactions, vol. 71, Part I ,1965, p. 162. The underlying assumption has been that the laboratory data, in terms of the reactivity index, correlates with system performance, at least as far as the failure mechanism at the discharge valve is concerned. In other words, the chemical reactivity has been equated with the coking of discharge valves.

As a result of this work, oil suppliers have directed their development efforts in the past decade to improving the laboratory reactivity index of refrigeration oils. At least one commercial oil has a reactivity index of 0.2, which is a four fold improvement over the product marketed a few years ago. The old product itself was quite satisfactory, and had about half the reactivity index as white oil with lubricity additives.

Therefore, carbonization cannot necessarily be prevented by the use of oils with a low laboratory reactivity index. It, therefore, becames apparent that this carbonization is the direct result of high discharge temperature. The term "thermal stability" will be used to define the tendency of an oil to resist coking at these elevated temperatures.

Example 3

Two runs have been made which provide an insight into the critical properties of a thermally stable oil, and illustrate the advantages of the present invention. These runs were done on complete systems, i.e.: on domestic U.S. refrigerator-freezers. The critical cavity temperature was monitored by a thermocouple mounted inside the compressor next to the discharge valve and the results are based on this discharge "cavity temperature." The commercial refrigerator-freezer systems had to be modified in order to obtain the high cavity temperatures. Shortening of the auxiliary oil cooler condenser and an adjustment of the overload protector were usually enough to operate the systems at high cavity temperatures. In a typical coking experiment, the refrigerator-freezer was operated in a 110° F. ambient continuously for seven days with no door opening. The compressor was then torn down and the valves examined for deposits.

The first experiment used a commercial 200 SUS paraffinic oil (Oil B, Table 3) marketed under the trade name "Suniso 21." This oil is not recommended for refrigeration application by the supplier because of its poor chemical stability. This particular sample had a laboratory reactivity index of 6.0. In a sealed tube test, the contents became black and gummy, the steel corroded, and a fair amount of acid was formed.

In the "coking experiment" however, this oil formed a negligible amount of coke. The valve leaves had darkened with a thin varnish-like coating on the entire valve leaf. This varnish was quite different from the carbon build-up, in that it did not appear to interfere with the seating of the valve.

Aside from the chemical reactivity index, Oil B differed from Oil A in two ways. One was its structure. Oil B was paraffinic, whereas Oil A was naphthenic. The other was its distillation range. The entire distillation curve of Oil B was about 100° F. higher than that of Oil A.

The second run was conducted to check which of these two differences were most important for thermal stability. Oil C is a refrigeration grade, 500 SUS naphthenic oil, marketed as Suniso 5 GS. Its reactivity index is approximately 1.0. Its distillation range is approximately the same as Oil B. The valve leaves with this oil were also free of interfering deposits when run in a "coking experiment." Some varnish had formed, but there was no build-up of deposits at any place.

It appears that the boiling range of an oil is the key to thermal stability. The structure per se, whether naphthenic or paraffinic is incidental and a low laboratory reactivity index is not essential for good thermal stability.

It must also be recognized that good chemical stability, the appropriate viscosity grade, good viscosity-temperature relations, good solubility characteristics with refrigerants and good lubricating properties are among the many time tested requirements of a refrigeration oil. Thermal stability is simply an additional requirement, to the preceding oil properties.

Both Oil B and Oil C lack some of the traditional requirements. The better thermal stability of Oil C is believed to be due to the increased viscosity. The higher viscosity causes difficulty in cold start-up and also causes greater frictional losses. In the case of Oil B, the extreme reactivity was a major concern. Moreover, paraffinic oils have poorer solubility relations with refrigerants, require expensive dewaxing to meet the low floc requirements and are believed to have inadequate lubricating properties. The traditional naphthenic oils do not have these drawbacks.

The present invention provides an oil which is basically naphthenic, yet has a high boiling range without significant increase in viscosity. The properties of one such oil (Oil D) are shown in Table 3.

The valves of a compressor remain clean after 7 days at 405° F. using Oil D. The entire valve area remained clean, no varnish or carbon build up occurred. In addition to thermal stability, this oil satisfies all the other requirements of a refrigeration oil. The slightly higher viscosity creates no problems under cold start-up and the frictional losses are not noticeably different with this oil than the presently used commerical Oil A.

The boundary lubricating properties were found to be as good as the present oils in laboratory tests in the refrigerant environment, and confirmed by numerous system tests. The higher floc point of Oil D poses no problems. This was confirmed by operating a system with R22 and with R502 (a well-known azeotropic mixture of 48.8% R22 and 51.2% chloropentafluoroethane) at −45° F. evaporator temperature. No congealing of the oil phase was detected and the oil return to the compressor was quite satisfactory.

Long term 4000 hour life tests, at 400° F. temperature in the discharge cavity, were also conducted to prove the performance of Oil D. Under these conditions, some deposits were formed, but the nature and the extent of the deposits qualitatively were considered to be tolerable. In contrast, the traditional oils, which show some build up at 405° F. In seven days, would completely clog the valve ports and stop the compressor in about 3 weeks.

Example 4

Surprisingly, Oil B, which had a very high laboratory reactivity index, still had excellent thermal stability. However, even if there were no interfering deposits on the valves, the varnish build-up and the dark appearance of the valve leaves were not desirable. Also, after a few days in air, the valve leaves showed rust, which was not the case with Oil D. Two experiments were performed to determine the effect of Laboratory Reactivity Index. Oil B was refined to obtain an index of about 0.1. A less refined version of Oil D, having an index of about 4.0 was also procured. This oil was made as in Example 1 except that the paraffinic component was not clay contacted. In both cases, the well refined version showed a clean valve leaf whereas the less refined versions showed a darkened appearance and some formation of a varnish like deposit. The valve leaves with the less refined oils also rusted after a few days in air and in some cases, the varnish could be peeled off as flakes exposing a rusted steel surface underneath. The desirability of a low laboratory reactivity index for good general performance cannot therefore be denied.

It is clear that coking of the valves is a result of oil breakdown. The question to be resolved is the lack of correlation between laboratory tests for chemical reactivity of oils and refrigerant, and the breakdown of the oil at the valve leaves.

Determination of R22 formed in the test runs did not give meaningful results. In general, when the valve leaves were clean, the R22 formed was 0.2–0.3 percent. One would expect that when deposits were formed, the R22 formation would be higher. This was not always the case. In some experiments when deposits were noted, the R22 formed was only 0.2–0.3 percent and in others it was 0.7–1.0 percent.

However, the physical appearance of the valve leaves after teardown offered a clue. It was repeatedly noted that when the high boiling oils were used, the valve leaves were considerably wetter, i.e., covered with a layer of oil. With the present commercial oils, the valve leaves appeared dry. The formation of deposits probably depends on whether the oil refrigerant mixture impinges on a dry or on a wet surface. If the surface is wet, a liquid phase reaction similar to that in a sealed tube test would occur between the oil and refrigerant. If the oil mist comes in contact with a dry valve surface, not only would the reaction occur in a different manner, but the reaction products would tend to accumulate on the valves. The high boiling oils probably keep the valve leaf wet and permit any reaction products to circulate freely in the system.

The new Oil D discussed earlier was formulated for general use, i.e., for refrigeration down to −40° F. and for air conditioning. For speciality applications, where thermal stability may be the prime requirement, the correlation between thermal stability and the boiling range can be put to further advantage. This is done by extending the boiling range even higher than in the case of Oil D. An experimental oil was made (Oil E) with a boiling range which extended to a final boiling point of over 1150° F. The temperature at the discharge cavity was 430° F.–440° F., and the duration of the test was seven days. The steel had darkened, but no interfering deposits were formed.

This temperature level at the discharge cavity already strains the other component of the system, and further extension of the thermal stability correlation seems more of academic interest than of any practical significance. Nevertheless, some experiments were made with Oil F, which was a specially formulated synthetic paraffinic white oil whose boiling range was far higher than the available mineral oils. After considerable difficulty, one refrigerator-freezer unit was operated for an extended period, at a temperature of 475° F. in the discharge cavity. After 820 hours and with the system still operating satisfactorily, the test was stopped.

Tear down analysis showed no interfering deposits nor varnish on the valve leaves. Other components also showed the effects of a high temperature, such as the embrittlement of the motor insulation and discoloration of some of the steel surfaces.

It should be emphasized that the correlation of thermal stability of an oil with deposit formation has been found largely with mineral hydrocarbon oils. The synthetic oil was also a branched chain paraffinic hydrocarbon type. For other synthetic non-hydrocarbon type oils or even for alkylated benzene type oils the present thermal stability correlation may or may not hold. Other characteristics—thermal cracking or chemical reactions with the various materials in the system may well be the controlling factors.

The trend towards higher operating temperatures of refrigeration compressors is limited by the danger of coking of discharge valves. The phenomenon of coking is found to be the direct result of oil breakdown rather than an indirect result of the thermal degradation of motor insulation. However, existing laboratory tests cannot be used to predict the carbonizing tendency of a refrigeration oil. Some oils which show a very low reactivity in laboratory tests may indeed form coke and others which show poor stability in laboratory tests may have excellent non-coking characteristics. The term "thermal stability" as distinguished from "chemical stability" is suggested to define the non-coking characteristic of an oil.

Thermal stability is found to be related to the boiling range of the refrigeration oil. The higher the boiling range, the higher is the thermal stability.

For satisfactory performance at high operating temperatures, both thermal stability and chemical stability are found to be necessary. Refrigeration oils, totally of mineral origin, which combine these characteristics without sacrificing the other traditional requirements have been developed. One commercial oil of this nature has been extensively tested and found to be suitable for low temperatures of down to −40° F. as well as for air conditioning applications such that it can be used "across the board" as an improved refrigeration oil.

For specialty purposes where the thermal stability may be the prime requirement, the correlation of the boiling range has been utilized to an extent that other components in the system are strained and coking is not the weak link. This has been achieved with mineral oils without resorting to any synthetic materials.

Synthetic materials do have an advantage because they can be tailored to provide a higher boiling range than is possible with mineral oils, without a corresponding increase in viscosity. Thus, specially formulated synthetic oils of a paraffinic hydrocarbon type can be used without danger of coking at incredibly high discharge temperatures. This has been demonstrated by operating a refrigerator-freezer system at 475° F. in the discharge cavity for over one month.

In the discussion above, "coil temperature" as been loosely used as a synonym for the more technically correct term "winding temperature."

The blends of the present invention can in some instances advantageously contain such additives as a "metal deactivator," an antifoam, an antiwear agent, an antioxidant or mixture of antioxidants (such as zinc dialkyl dithiophosphate and/or ditertiarybutyl paracresol).

TABLE 1.—TYPICAL PROPERTIES OF BLENDED REFRIGERATION OIL

| Test | Method | Example 1 blended refrigeration oil | Typical range |
|---|---|---|---|
| Viscosity, SUS/100° F | D2161 | 227 | 210–240. |
| Viscosity, SUS/210° F | D2161 | 46 | 45–52. |
| Flash, COC, ° F | D92 | 355 | 340 min. |
| Fire, COC, ° F | D92 | 390 | |
| Pour, ° F | D97 | −35 | −25 max. |
| Viscosity—gravity constant | Calculated | 0.847 | |
| Color | D1500 | L 1.0 | 2.0 max. |
| Gravity, ° API | D287 | 26.0 | 25–27. |
| Total acid number, mg. KOH/g | D974 | 00.0 | 0.05 max. |
| Dielectric strength kv | D877 | 30 | 25 min. |
| Inorganic chloride and sulfates | D878 | None | |
| Basic nitrogen, p.p.m | (²) | 1 | |
| Free sulfur | D989 | None | |
| Corrosive sulfur; class | D1275 | #1 | |
| Total sulfur, percent | D129 | 0.04 | |
| Aniline point, ° F | D611 | 195 | |
| Refractive index | D1747 | 1.4945 | |
| Aromatics, gel, percent | | 30 | |
| Floc, ° F | (²) | −47 | −35 max. |
| Power factor/25° C., initial | D294 | 0.0001 | |
| Power factor/100° C., initial | D294 | 0.0086 | |
| 14-day sealed tube, wt. percent R-22 | (²) | 0.6 | 1.0 max. |

¹ ASTM test designation.
² Floc and sealed tube tests are with R-12 refrigerant and are described in this specification. The basic nitrogen test is described in Serial No. 850,779.

TABLE 2.—DISTILLATION RANGES FOR EXAMPLE 1 COMPONENTS AND BLEND
[° F. at 760 mm.¹]

| | Hydrofined naphthenic component | Refrigeration oil blend of Example 1 | Dewaxed paraffinic component |
|---|---|---|---|
| Initial | 581 | 561 | 744 |
| Percent: | | | |
| 5 | 632 | 606 | 801 |
| 10 | 650 | 632 | 844 |
| 20 | 674 | 667 | 887 |
| 30 | 690 | 695 | 908 |
| 40 | 705 | 726 | 922 |
| 50 | 721 | 760 | 933 |
| 60 | 736 | 808 | 946 |
| 70 | 755 | 861 | 959 |
| 80 | 777 | 908 | 975 |
| 90 | 803 | 957 | 1,000 |
| 95 | 826 | 980 | 1,021 |
| Final | 842 | 993 | 1,037 |

¹ The distillations were made at reduced pressure and corrected (or extrapolated) to one atmosphere.

TABLE 3.—TYPICAL PROPERTIES OF REFRIGERATION OILS

| Oil | A | B | C | D¹ | E | F |
|---|---|---|---|---|---|---|
| Viscosity, SUS, 100° F | 155 | 205 | 500 | 230 | 190 | 220 |
| Viscosity index | 0 | 91 | 55 | 58 | 27 | 140 |
| API, Gravity | 22.8 | 31.3 | 24 | 26 | 23.5 | 38.7 |
| Color, ASTM | 0.5 | 1.0 | 1.0 | 1.0 | 0.5 | 0.5 |
| Molecular wt | 300 | 394 | 370 | 340 | 330 | 640 |
| Composition, percent: | | | | | | |
| $C_A$ | 14 | 5 | 7 | 11 | 12.5 | |
| $C_N$ | 43 | 31 | 46 | 40 | 42 | 0 |
| $C_P$ | 43 | 64 | 47 | 49 | 45.5 | 100 |
| Gel, aromatics percent | 34 | 15 | 22 | 27.5 | 30 | 0 |
| Flash point, ° F | 340 | 395 | 420 | 375 | 350 | 470 |
| Pour point, ° F† | −45 | 0 | −40 | −30 | | −60 |
| Floc point, ° F | −68 | −40 | −50 | −45 | −40 | (²) |
| 14 day sealed tube reactivity, percent R22 formed | 0.2 | 6.0 | 1.0 | 0.6 | 0.2 | 0 |
| Boiling range: | | | | | | |
| Initial B.P., ° F | 580 | 740 | 640 | 580 | 580 | 800 |
| 50%, ° F | 720 | 840 | 810 | 770 | 750 | 920 |
| Final B.P., ° F | 840 | 950 | 950 | 990 | 1,150 | 1,200 |

¹ Blend of high boiling paraffinic oil and naphthenic oil according to present invention.
² No wax.

$C_P$ percent, $C_A$ percent and $C_N$ percent represent, respectively, percent paraffinic carbon atoms, percent aromatic carbon atoms and percent naphthenic carbon atoms by the carbon-type anlysis disclosed in, Aspects of the Constitution of Mineral Oils, Van Nes and Van Westen (1951) at page 335 et seq. $C_P$, $C_A$ and $C_N$ add up to 100% and are approximations of the proportions in the oil of carbon atoms occurring in, respectively, acyclic chains, aromatic rings and saturated ring structures.

The invention claimed is:

1. A composition, useful as a refrigeration oil, comprising a blend of from 50–75 volume percent of a hydrorefined naphthenic oil component and from 50–25% of a wax-free paraffinic hydrocracked lube, said blend containing at least 10 weight percent aromatic hydrocarbons and having a SUS viscosity at 100° F. in the range of 100–500 and a natural floc point no higher than −35° F. in $CCl_2F_2$ refrigerant.

2. The composition of claim 1 and having a basic nitrogen content no greater than 10 p.p.m.

3. The composition of claim 2 wherein no greater than 2.5 wt. $CHClF_2$ is determined after 14-days of sealed tube stability testing at 347° F. with $CCl_2F_2$ refrigerant in the presence of a steel strip.

4. The composition of claim 1 and having better thermal stability than a naphthenic refrigeration oil of about the same viscosity at 100° F.

5. The composition of claim 4 and which, compared with said naphthenic refrigeration oil, produces significantly less coke deposit on throttle valves when used for about 2,000 hours in a compressor which is operated at an average coil temperature in the range of 140–170° F.

6. The composition of claim 5 wherein the basic nitrogen content is less than 5 p.p.m. and wherein no greater than 1.0 wt. percent of $CHClF_2$ is determined after 14- days of sealed tube stability testing at 347° F. with $CCl_2F_2$ refrigerant in the presence of a steel strip.

7. A composition according to claim 1 and having a wide distillation range compared to the distillation range of a prior art naphthenic or paraffinic petroleum oil refrigeration composition of the same viscosity at 100° F., said distillation ranges being compared at one atmosphere.

8. A composition according to claim 7 wherein said hydrorefined naphthenic oil component has a viscosity at 100° F. in the range of 100–750 SUS and wherein at least 50 volume percent of said dewaxed paraffinic hydrocracked lube distills above 900° F., the distillation being corrected to one atmosphere.

9. A composition according to claim 8 and having a viscosity at 100° F. in the range of 125–300 SUS.

10. A composition according to claim 1 and having a viscosity at 100° F. in the range of 150–250 SUS.

11. The composition of claim 1 wherein the wax-free paraffinic hydrocracked lube is a raffinate product from solvent extraction of a hydrocracked lube.

12. Process of lubrication of a refrigeration system wherin the lubricant is the oil of claim 1.

References Cited
UNITED STATES PATENTS

| | | | |
|---|---|---|---|
| 2,190,918 | 2/1940 | Goethel et al. | 208—19 |
| 3,196,102 | 7/1965 | Mills et al. | 208—14 |
| 3,145,161 | 8/1964 | Anderson et al. | 208—14 |
| 3,192,153 | 6/1965 | Smilski | 208—264 |
| 2,360,446 | 10/1944 | Reid | 208—19 |

HERBERT LEVINE, Primary Examiner

U.S. Cl. X.R.

62—84; 208—19